Patented Nov. 8, 1938

2,136,138

UNITED STATES PATENT OFFICE 2,136,138

DISAZO DYESTUFFS AND PROCESS FOR THEIR PREPARATION

Adolf Krebser, Riehen, near Basel, Switzerland, assignor to the firm J. R. Geigy A. G., Basel, Switzerland No Drawing. Application April 20, 1937, Serial No. 138,065. In Germany May 8, 1936

13 Claims. (Cl. 260—178)

According to this invention valuable oil and fat soluble disazo-dyestuffs which are insoluble in water but very suitable for dyeing and colouring cellulose ester and spirit lacquers, oils, fats, hydrocarbons, resins, waxes and so on as well as for application in the graphic art, for example in copper-plate printing, are made by coupling tetrazotized substituted or unsubstituted diaminodiphenylsulphones with 2 molecular proportions of amines of the benzene or naphthalene series, containing neither sulphonic nor carboxylic group.

In comparison with the commercial dyestuffs the new ones are distinguished partly by the brightness of the shade and generally by an excellent fastness towards sublimation. In this regard they even surpass the related insoluble disazo-dyestuffs of the U. S. Patent No. 1,819,957 made by coupling tetrazotized diamines of the di- and triarylmethane series and amines and phenols capable of being coupled, which dyestuffs are especially distinguished from the common dyes soluble in oil and fat by their qualification for graphic purposes, particularly for copper-plate printing. The fastness towards sublimation of the new dyestuffs also surpasses that of the dyestuffs of the U. S. Patent No. 2,036,944 and 2,032,133 made from tetrazotized 4,4'-diamino-2,2'-dimethyldiphenyl or 4,4'-diaminodiphenylsulphide and 4,4'-diaminodiphenylether and the above named coupling components.

The following examples illustrate the invention:—

Example 1

6.2 kg of m,m'-diaminodiphenlysulphone are tetrazotized in known manner and slowly run at 0° C. into an aqueous uniform suspension of 9.1 parts of α-naphthylamine-hydrochloride, followed by the addition of sodium acetate solution to gradually neutralize the mineral acid. When the coupling is complete, the new insoluble dyestuff is filtered, washed neutral and dried. It forms a brownish-red powder, dissolving in concentrated sulphuric acid red-violet and colouring lacquers on the base of nitro- and acetylcellose, mixtures of resins and solvents commonly used for copper-plate printing in pure yellowish-brown tints. The prints obtained therewith are of very good fastness towards sublimation.

If in the above combination the α-naphthylamine is replaced by the equivalent quantity of mono-ethyl-α-naphthylamine, there is obtained a dyestuff with quite similar properties, forming a red powder soluble in concentrated sulphuric acid with red-violet tints and furnishing according to graphic methods brownish-red prints. With β-naphthylamine an orange coloured powder is obtained, dissolving blue in concentrated sulphuric acid. With monoamines of the benzene series such as m-toluidine, p-xylidine and so on, similar dyestuffs are obtained.

Example 2

The tetrazonium compound of Example 1 when coupled with 6.2 parts of m-toluplene-diamine or the corresponding quantity of m-phenylene-diamine gives dyestuffs with similar properties with the exception of the shade which is more yellow. These orange powders dissolve orange-red in concentrated sulphuric acid.

Equivalent parts of tetrazotized m,m'-diamino-p,p'-ditolylsulphone or m,m'-diamino-p,p'-dimethoxydiphenylsulphone give quite similar dyestuffs.

With diamines of the naphthalene series, such as 1,5- and 2,7-naphthylene-diamine, quite similar dyestuffs are obtained.

Example 3

6.2 kg of p,p'-diaminodiphenylsulphone tetrazotized and coupled with a fine suspension of 9.1 kg of α-naphthylaminehydrochloride in presence of slowly added sodium acetate give a dull red powder soluble violet in concentrated sulphuric acid and brownish-red in lacquers on the base of cellulose esters and ethers and mixtures of resins and solvents adapted for copper-plate printing. The prints are of very good fastness towards sublimation. With mono- and diamines of the benzene series or diamines of the naphthalene series quite similar dyestuffs are obtained.

What I claim is:—

1. A process for the manufacture of azodyestuffs consisting in coupling a tetrazotized diaminodiphenylsulphone with an amine capable of being coupled, selected from the group of mono- and diamines of the benzene and naphthalene series, both the tetrazo and coupling components containing no group imparting solubility in water to the resulting dyestuff.

2. A process for the manufacture of azodyestuffs consisting in coupling a tetrazotized m-diaminodiphenylsulphone with an amine capable of being coupled, selected from the group of mono- and diamines of the benzene and naphthalene series, both the tetrazo and coupling components containing no group imparting solubility in water to the resulting dyestuff.

3. A process for the manufacture of azodyestuffs consisting in coupling a tetrazotized diaminodiphenylsulphone with a monoamine of the naphthalene series, both the tetrazo- and coupling components containing no group imparting solubility in water to the resulting dyestuff.

4. A process for the manufacture of azodyestuffs consisting in coupling a tetrazotized diaminodiphenylsulphone with a m-diamine of the benzene series, both the tetrazo- and coupling components containing no group imparting solubility in water to the resulting dyestuff.

5. Azodyestuffs from a tetrazotized diaminodiphenylsulphone and an amine capable of being coupled, selected from the group of mono- and diamines of the benzene and naphthalene ries, containing no group imparting solubility in water to the resulting dyestuff, said dyestuffs being distinguished by their brightness of the shade and by an excellent fastness towards sublimation especially in copper plate printing.

6. Azodyestuffs from a tetrazotized m-diamino-diphenylsulphone and an amine capable of being coupled, selected from the group of mono- and diamines of the benzene and naphthalene series, containing no group imparting solubility in water to the resulting dyestuff, said dyestuffs being distinguished by their brightness of the shade and by an excellent fastness towards sublimation especially in copper plate printing.

7. Azodyestuffs from a tetrazotized diaminodiphenylsulphone and a monoamine of the naphthalene series, containing no group imparting solubility in water, said dyestuffs being distinguished by their brightness of the shade and by an excellent fastness towards sublimation especially in copper plate printing.

8. Azodyestuffs from a tetrazotized diaminodiphenylsulphone and a m-diamine of the benzene series, containing no group imparting solubility in water, said dyestuffs being distinguished by their brightness of the shade and by an excellent fastness towards sublimation especially in copper plate printing.

9. Azodyestuffs from a tetrazotized m-diaminodiphenylsulphone and a monoamine of the naphthalene series, containing no group imparting solubility in water, said dyestuffs being distinguished by their brightness of the shade and by an excellent fastness towards sublimation especially in copper plate printing.

10. Azodyestuffs from a tetrazotized m-diamino-diphenylsulphone and a m-diamine of the benzene series, containing no group imparting solubility in water, said dyestuffs being distinguished by their brightness of the shade and by an excellent fastness towards sublimation especially in copper plate printing.

11. The azodyestuff from tetrazotized m-diamino-diphenylsulphone and 2 molecular parts of α-naphthylamine, being a brownish red powder, dissolving in concentrated sulphuric acid to a red-violet solution and coloring lacquers on the base of nitro- and acetylcellulose, mixtures of resins and solvents commonly used for copper plate printing in pure yellowish brown tints, the copper plate printings being of very good fastness towards sublimation.

12. The azodyestuff from tetrazotized m-diaminodiphenylsulphone and 2 molecular parts of m-phenylenediamine, being an orange powder, dissolving in concentrated sulphuric acid to an orange-red solution and coloring lacquers on the base of nitro- and acetylcellulose, mixtures of resins and solvents commonly used for copper plate printing in pure yellowish-brown tints, the copper plate printings being of very good fastness towards sublimation.

13. The azodyestuff from tetrazotized m-diamino-diphenylsulphone and 2 molecular parts of m-toluylenediamine, being an orange powder, dissolving in concentrated sulphuric acid to an orange-red solution and coloring lacquers on the base of nitro- and acetylcellulose, mixtures of resins and solvents commonly used for copper plate printing in pure yellowish-brown tints, the copper plate printings being of very good fastness towards sublimation.

ADOLF KREBSER.